3,440,073
ASPHALTIC MATERIALS
Loren M. Fowler and Harry D. Burrell, Lawrenceville, Ill., assignors to Witco Chemical Company, Inc., New York, N.Y., a corporation of New York
No Drawing. Filed Mar. 15, 1965, Ser. No. 439,960
Int. Cl. C10c 3/04; C08h 13/00
U.S. Cl. 106—273                                                  7 Claims

ABSTRACT OF THE DISCLOSURE

Reducing the objectionable odors of asphaltic materials, particularly for use of said asphaltic materials as sealants in refrigerators and freezers, by air blowing and steaming the asphaltic materials, in hot liquid from, and incorporating in said hot liquid asphaltic materials, prior to or during the air blowing or steaming steps, a water solution of a water-soluble inorganic alkaline material such as sodium hydroxide, sodium carbonate and potassium hydroxide.

---

This invention relates to the production of improved asphaltic materials and more particularly to asphalt materials which have been so prepared that they do not impart undesirable odors and tastes to food and other products when used, for instance, as sealants or the like, in the manufacture of refrigerators and freezers, for keeping out dust and odors from the interiors of such units.

Asphaltic materials, the residuals of petroleum refinery operations, are available with a wide range of physical properties depending upon the sources of the crude petroleum and the refinery operations from which they are derived. Notwithstanding the ranges of properties available, a common characteristic thereof is a high odor level which limits their utility or applicability for use in consumer items, such as refrigerators or freezers, where low odor level is an important desideratum. Extensive efforts have been expended over the years with only limited success to develop economical but effective methods for producing deodorized asphaltic products. One of the more successful of these methods involves a steam cleaning operation whereby live steam is bubbled through hot air blown asphaltic fluxes or residuals for several hours immediately prior to their being transferred to storage or shipping tanks. The resulting asphaltic products, however, do not completely satisfy the low odor level requirements of asphaltic materials for use in environments where food products are stored.

It is an object of the present invention to provide new and improved asphaltic materials which are essentially odor free and which do not impart undesirable odor and taste characteristics to food and other products.

It is another object of the present invention to provide methods for the preparation of said improved essentially odor free asphaltic materials.

In accordance with the invention, it has been discovered that, in the method of producing deodorized asphaltic materials with desired physical properties by bubbling air and steam through hot asphalt fluxes, a surprising and unexpected improvement in the odor level of the asphaltic materials is obtained by incorporating into the hot asphalt fluxes a distinctly small or minor quantity of a water solution of one or more water-soluble inorganic alkaline materials.

The inorganic alkaline material should be present, generally speaking, in amounts of at least 0.15% by weight and preferably between about 0.25% and 2.0% by weight based on the weight of the asphaltic material. Greater proportions can be used but are unnecessary and more than about 5% should not be used. A water solution of the inorganic alkaline material is prepared and the desired amount of said solution is then incorporated into the hot liquid asphaltic flux prior to or during the air blowing or steaming steps, but especially desirably at the beginning or during the early stages of the air blowing treatment.

Water solutions of the water-soluble inorganic alkaline materials suitable for use in accordance with the invention have a pH of at least 8. Water-soluble inorganic alkaline materials suitable for use in preparing the water solutions used pursuant to the present invention may be selected from a wide group including, by way of example, alkali metal and alkaline earth metal compounds, notably their hydroxides, carbonates and borates. These include by way of example, sodium hydroxide, sodium carbonate, sodium borate, potassium hydroxide, potassium carbonate, lithium hydroxide, and barium hydroxide. Sodium carbonate is especially satisfactory and its use, in the form of aqueous solutions, represents a particularly important, though limited, embodiment of the invention.

Air blowing asphaltic or blended asphaltic materials is a method commonly used to produce specialty asphaltic products. The procedure involves heating the raw asphaltic materials to an elevated temperature, generally in the range of about 350° F. to 500° F., and then bubbling a high volume of low pressure air through the hot asphaltic materials generally for at least one hour or as long as is necessary to attain the desired physical properties. As stated above, the improved low level odor asphaltic products of the present invention are produced by incorporating into the hot asphaltic materials, preferably during the air blowing period, at least about 0.15%, and preferably between about 0.25% and 2.0%, by weight, based on the weight of the asphaltic materials, of a water-soluble inorganic alkaline materials in the form of a water solution thereof, and the alkaline solids content of the water solution should advantageously constitute at least 10% and, better still, from 15% to 25%, by weight.

After the air blowing, steaming is effected preferably by bubbling live steam through the hot liquid asphaltic material or flux for several hours. Alternatively, steam can be bubbled through the hot liquid asphaltic material or flux concurrently with the air blowing operation, or the steaming can be started at any time during the air blowing operation but, in any case, steaming should be continued for at least about 30 minutes after the air has been shut off.

The temperature of the asphaltic materials, generally speaking, is maintained in the range of about 350° F. to 500° F. during the entire period of treatment. Asphaltic materials are usually blends of a variety of basic raw material fluxes or residuals from different sources and petroleum refining operations, each of which contributes certain specific properties. There are four basic categories of asphaltic fluxes or residuals available from the refinery, these being (1) straight run fluxes, (2) cracking still tars, (3) solvent extract asphalts, and (4) steam reduced asphalts. The source of the crude petroleum also results in variations of the properties of the asphaltic raw materials. East Coast refineries usually process crude petroleums obtained from South America and the Middle East which produce asphaltic residuals differing from those resulting from processing Mid-Continental or Far West sources of crude petroleums. The present invention results in improved low level odor asphaltic products regardless of the type or source of the asphaltic raw materials.

Various supplemental ingredients can be incorporated into the asphaltic raw materials and deodorized air blown asphaltic materials in order to modify them to meet certain specific end uses. These comprise, by way of example, various resins, waxes, oils, elastomers, inert pigments and the like. Blends of the deordized asphaltic materials can also be used without increasing the odor level of the end use products.

The following examples are illustrative of the practice of the invention.

Example 1

(a) A blend of Mid-Continent vacuum reduced residual asphalt having an 80° F. softening point, and a naphthenic oil having a viscosity of 300 S.U.S. at 100° F. was prepared in the ratio of 90 parts by weight of said asphalt to 10 parts by weight of said oil. The blend was fed into a still having heating means and a series of perforated pipes running along the bottom. The blend was heated to 300° F. to produce a molten mass at which time air was introduced through some of the perforated pipes bubbling up through said molten mass. Continued heating was carried out to raise the temperature of the mass up to 400° F. at which level it was maintained.

(b) A 25% alkaline water solution was prepared comprising 0.5 weight part of sodium carbonate per 100 weight parts of said asphaltic blend and was pumped into the hot asphaltic mass.

(c) Live steam was then introduced into the remaining perforated pipes. The air and steam were bubbled through the hot asphaltic mass for several hours until it was determined that a ring and ball ASTM E28–58T softening point of 175° F. to 200° F. had been attained, at which time the air was cut off, and the steaming was continued for approximately an additional 30 minutes before being shut off.

(d) A sample of the finished asphaltic product, after being cooled to room temperature, was sealed in one quart Mason jar alongside a patty of fresh unsalted whipped butter. The jar was then placed in a refrigerator and allowed to remain therein for 24 hours. The jar was then opened and the sample of butter which had been exposed to the treated asphaltic material was tasted and compared with the taste of the same butter but which had not been exposed to the treated asphaltic material under test. No material difference was observed in the tastes of the exposed and unexposed butter samples.

(e) An asphaltic product was made by following the same procedure as described in parts (a) and (c), step (b) being omitted. A similar test was then run as described in part (d). The butter which was placed in the Mason jar with the asphaltic material had picked up a very definite and objectionable order from the asphaltic material.

Example 2

A vacuum reduced Mid-Continent asphalt flux was used in this example and was treated in accordance with the procedure described in Example 1 with 0.5 part by weight sodium carbonate per 100 parts by weight of the asphalt, said sodium carbonate being incorporated in the form of a 25% by weight water solution. After the asphaltic materials exhibited softening point and penetrating properties of 180° to 195° F. and 20 to 30 (at 77° F.), respectivley, samples were taken and allowed to cool to room temperature. A cooled sample of the treated asphalt was then sealed in a glass Mason jar adjacent a pat of butter, as described in Example 1. After 24 hours at room temperature, the jar lid was removed. The butter was essentially free of any malodor.

Example 3

The procedure of Example 1 was used to treat and evaluate an asphaltic flux prepared by blending 80% by weight of an 85–100 penetration vacuum steam reduced asphalt flux and 20% by weight of a propane extract flux. Air blowing was stopped after the asphalt samples had softening point and penetration values of 190° to 195° F. and 15 to 20 (at 77° F.), respectively. The sealed jar odor test results were similar to those observed in Example 2.

Example 4

(a) A production still was loaded with an asphaltic blend of 5400 gallons of Mid-Continent vacuum reduced residual asphalt and 620 gallons of naphthenic oil of 300 S.U.S. at 100° F. viscosity. The asphaltic material was heated to 400° F. with air being first introduced when the temperature reached 300° F.

(b) 300 pounds of sodium carbonate was dissolved in 120 gallons of water and the solution was added to the asphaltic blend when the temperature of said blend reached 400° F.

(c) Live steam was introduced into the hot asphaltic blend immediately after the alkaline solution was added and was bubbled through said blend for 11 hours. After 9 hours and 45 minutes the air was shut off and the softening point and penetration at 77° F. were determined to be 178° F. and 84, respectively.

(d) After the steam was shut off, a pint sample of the asphalt was allowed to cool to room temperature. No odor was observed to be emitting from the cool asphalt. A 15 to 20 gram sample was then submitted to a panel taste and odor butter comparison test described in Example 5. The accumulative results of this panel test were 5.

Example 5

(a) An asphaltic flux blend of 92 weight parts of a Mid-Continent vacuum reduced residual asphalt and 8 weight parts of a naphthenic oil of 300 S.U.S. at 100° F. viscosity was made.

(b) A portion of the asphaltic flux blend was heated to and maintained at approximately 400° F. and air was then bubbled through the hot blend for 4 hours after which time a softening point of 180° F. and penetration of 85 (at 77° F.) was measured. A sample of the treated material was removed and allowed to cool to room temperature.

(c) Steam was then introduced into and bubbled through the hot, air treated batch from part (b) for 3 hours. A sample of the steam treated material was taken and allowed to cool to room temperature.

(d) A portion of the asphaltic flux of part (a) hereof was heated to and maintained at approximately 400° F. and air was introduced into and bubbled through the material for 4 hours. A 25% solution of sodium hydroxide in water was prepared and an amount of this solution containing 0.25 weight part of sodium hydroxide per 100 weight parts of the asphaltic flux was incorporated into said flux shortly after the air was introduced. When the air was shut off, the asphaltic flux was found to have a softening point of 179° F. and penetration of 70 at 77° F. A sample of the treated asphaltic flux was taken and allowed to cool to room temperature.

(e) The hot batch from part (c) hereof was then treated with steam for 3 hours after which time a sample was removed and allowed to cool to room temperature.

(f) The procedure of part (d) hereof was repeated except that 0.125 weight part of sodium hydroxide per 100 weight parts of asphaltic flux was incorporated into the flux as a 25% water solution. A sample was taken after the air was shut off and allowed to cool to room temperature.

(g) The hot asphalt from part (f) hereof was steam treated for 3 hours after which a sample was taken.

(h) The procedure of part (d) hereof was repeated except that 1.0 weight part of sodium carbonate per 100 weight parts of asphaltic flux was incorporated in the hot flux as a 25% water solution.

(i) The asphalt from part (h) hereof was steam treated for 3 hours.

The treated samples from (b) to (i) above were evaluated in accordance with an industry accepted taste and odor pick-up test. A panel of five people was used in conducting the test who rated the samples according to the following numbering system:

Rating of—1 .... No taste imparted to butter.
2 .... Very slight taste—not objectionable.
3 .... Slight taste—still acceptable.
4 .... Pronounced taste—doubtful.
5 .... Very bad—not acceptable.

A 15 to 20 gram representative sample of the material to be tested and a patty of fresh unsalted whipped butter were sealed in a quart Mason jar. The jar was placed in a refrigerator. After 24 hours, the sample of butter which had been exposed to the material under test was tasted and compared with the taste of butter that had not been exposed to the material under test. The product was then evaluated and rated on the basis of the extent of taste and odor pick-up imparted to the butter as compared to unexposed butter, the total rating by the 5 testers being used for comparing the various samples, an accumulative rating of 5 indicating no taste imparted to the butter.

The odors of treated samples from (b) to (i) above were checked after they had cooled to room temperature. Representative samples of each of the treated materials (b) to (i) were placed in quart Mason jars alongside a patty of fresh unsalted whipped butter, the jars were sealed and then placed in a refrigerator for 24 hours. The results of these tests were summarized in the following table.

TABLE

| Sample | Original odor | Taste and odor pick-up evaluation |
|---|---|---|
| (b) | Oily-asphaltic | 14.0 |
| (c) | Oily-asphaltic but less than (b) | 8.0 |
| (d) | Practically no odor | 5.5 |
| (e) | No odor | 5.0 |
| (f) | Slight odor | 5.5 |
| (g) | No odor | 5.0 |
| (h) | Practically no odor | 6.5 |
| (i) | No odor | 5.0 |

The superiority of samples treated with the alkaline solutions is evident from these results. Asphaltic materials prepared in accordance with (e), (g) and (i) are eminently suitable as refrigerator sealing materials. Accumulative panel ratings of 5 to about 6.5 represent results which are very satisfactory, those of 5 to 5.5 being particularly advantageous.

Example 6

(a) A production still was loaded with an asphaltic flux in the proportions of 7000 gallons of Mid-Continent vacuum reduced residual asphalt and 800 gallons of naphthenic oil of 300 S.U.S. at 100° F. viscosity.

(b) 300 pounds of borax was dissolved in 120 gallons of water.

(c) The batch of asphaltic flux was heated to and maintained at an approximate temperature of 400° F. The borax solution was added to the asphaltic flux immediately after a temperature of 400° F. has been reached. The same air and steam treatments described in Example 5 were used.

(d) A cooled sample of the treated asphaltic flux was found to have practically no odor and accumulative panel taste and odor test results were 5.5, thereby showing excellent suitability as a refrigerator sealer material.

What we claim as new and desire to protect by Letters Patent of the United States is as follows:

1. In a method of making improved asphaltic materials in which said asphaltic materials, in hot liquid form, are air blown and steamed at elevated temperatures, the improvement which comprises incorporating into the hot liquid asphaltic materials, prior to or during the air blowing or steaming steps, .15% to 5%, based on the weight of the asphalt, of a water solution of an inorganic alkaline material selected from the group consisting of sodium hydroxide, sodium carbonate, sodium borate, potassium hydroxide, potassium carbonate, lithium hydroxide, and barium hydroxide.

2. In a method of making improved asphaltic materials in which said asphaltic materials, in hot liquid form, are air blown and steamed at elevated temperatures, the improvement which comprises incorporating into the hot liquid asphaltic materials, prior to or during the air blowing or steaming steps, a water solution of sodium carbonate to introduce from 0.15% to 2% of sodium carbonate by weight of said asphaltic materials.

3. In a method of making improved asphaltic materials for use as sealants in refrigerators and freezers, and wherein said asphaltic materials in hot liquid form and at a temperature in the range of about 350° F. to 550° F., are air blown and steamed and wherein steaming is continued for at least 30 minutes after air blowing is discontinued, the improvement which comprises incorporating into said hot liquid asphaltic materials, prior to or during the air blowing or steaming steps, .15% to 5%, based on the weight of the asphalt, of a water solution of an inorganic alkaline material selected from the group consisting of sodium hydroxide, sodium carbonate, sodium borate, potassium hydroxide, potassium carbonate, lithium hydroxide and barium hydroxide.

4. A method according to claim 3, wherein the water-soluble inorganic alkaline material is sodium carbonate and wherein it is incorporated into the hot liquid asphaltic materials in the form of an at least 10% solution in water.

5. In the method of producing an odor-free asphaltic product in which asphalt raw materials are heated to a temperature of from 350° F. to 500° F., and the heated asphalt is treated with air and steam, the improvement of incorporating .15% to 5%, based in the weight of the asphalt, of a water solution of an alkaline material selected from the group consisting of sodium hydroxide, sodium carbonate, sodium borate, potassium hydroxide, potassium carbonate, lithium hydroxide and barium hydroxide in the hot asphalt.

6. An improved asphaltic material having a low odor level and adapted for use as a sealant in refrigerators and freezers comprising the reaction product of a hot liquid air blown and steam asphaltic material with .15% to 5%, based on the weight of the asphaltic material, of an aqueous solution of an inorganic alkaline material selected from the group consisting of sodium hydroxide, sodium carbonate, sodium borate, potassium hydroxide, potassium carbonate, lithium hydroxide and barium hydroxide.

7. The deodorized asphaltic product resulting from the treatment of asphaltic flux at a temperature of from about 350° F. to 500° F. with air and steam, the asphaltic flux having incorporated therein .15% to 5%, based on the weight of the asphaltic flux, of an aqueous solution of an inorganic alkaline material selected from the group consisting of sodium hydroxide, sodium carbonate, sodium borate, potassium hydroxide, potassium carbonate, lithium hydroxide and barium hydroxide.

References Cited

UNITED STATES PATENTS

| 2,375,117 | 5/1945 | Lentz | 106—273 |
| 2,524,644 | 10/1950 | Wentland | 106—273 |
| 2,876,126 | 3/1959 | Sommer | 106—122 |
| 2,901,369 | 8/1959 | Pordes | 106—122 |

JULIUS FROME, Primary Examiner.

J. B. EVANS, Assistant Examiner.

U.S. Cl. X.R.

106—270, 278, 279, 280, 281, 282, 283, 284; 208—6, 22, 44; 260—28